US011593177B2

(12) United States Patent
Misca et al.

(10) Patent No.: US 11,593,177 B2
(45) Date of Patent: Feb. 28, 2023

(54) COST-SAVINGS USING EPHEMERAL HOSTS IN INFRASTRUCTURE AS A SERVICE ENVIRONMENTS BASED ON HEALTH SCORE

(71) Applicant: VMware, Inc., Palo Alto, CA (US)

(72) Inventors: Dragos Victor Misca, San Francisco, CA (US); Sahan Bamunavita Gamage, San Jose, CA (US); Pranshu Jain, Sunnyvale, CA (US); Zhelong Pan, Cupertino, CA (US)

(73) Assignee: VMWARE, INC., Palo Alto, CA (US)

( * ) Notice: Subject to any disclaimer, the term of this patent is extended or adjusted under 35 U.S.C. 154(b) by 22 days.

(21) Appl. No.: 16/822,490

(22) Filed: Mar. 18, 2020

(65) Prior Publication Data

US 2021/0294651 A1    Sep. 23, 2021

(51) Int. Cl.
*G06F 9/50* (2006.01)

(52) U.S. Cl.
CPC ........ *G06F 9/505* (2013.01); *G06F 2209/505* (2013.01); *G06F 2209/5011* (2013.01); *G06F 2209/5014* (2013.01)

(58) Field of Classification Search
None
See application file for complete search history.

(56) References Cited

U.S. PATENT DOCUMENTS

| | | | |
|---|---|---|---|
| 2007/0239859 A1* | 10/2007 | Wilkinson | H04L 63/08 709/220 |
| 2013/0067267 A1* | 3/2013 | Tamhane | G06F 15/161 714/4.11 |
| 2015/0154056 A1* | 6/2015 | Chen | G06F 9/4856 718/103 |
| 2017/0187790 A1* | 6/2017 | Leckey | H04L 67/1008 |
| 2017/0207977 A1* | 7/2017 | Soni | H04L 41/147 |
| 2018/0101220 A1* | 4/2018 | Mahindru | G06F 1/324 |
| 2020/0026580 A1* | 1/2020 | Bahramshahry | G06F 9/4881 |

* cited by examiner

*Primary Examiner* — Meng Ai T An
*Assistant Examiner* — Zujia Xu
(74) *Attorney, Agent, or Firm* — Thomas | Horstemeyer, LLP (57) ABSTRACT

Various examples are disclosed for placing virtual machine (VM) workloads in a computing environment. Ephemeral workloads can be placed onto reserved instances or reserved hosts in a cloud-based VM environment. If a request to place a guaranteed workload is received, ephemeral workloads can be evacuated to make way for the guaranteed workload.

20 Claims, 4 Drawing Sheets

COST-SAVINGS USING EPHEMERAL HOSTS IN INFRASTRUCTURE AS A SERVICE ENVIRONMENTS BASED ON HEALTH SCORE

BACKGROUND

Enterprises are increasingly utilizing cloud computing environments to run enterprise computing workloads. For example, enterprises are increasingly utilizing virtual desktop infrastructure (VDI) environments and other virtualized computing environments to provide users with a consistent computing environment. Providing a VDI environment requires creating a virtualized version of a physical device, such as a server, a storage device, a central processing unit (CPU), a graphics processing unit (GPU), or other computing resources that can accessed through a VDI client by a remote user. The enterprise might choose to provide a VDI environment by utilizing hardware provided by a third party cloud computing environment. In this scenario, a third party environment provides the servers, networking connectivity, and other physical resources. The third party environment also handles the task of managing the physical server environment by handling issues such as server redundancy, failover management, data redundancy, and other tasks. An example of a third party environment is Amazon Web Services, which can provide computing resources on an on-demand or on a fixed, reserved basis.

However, enterprise users might not have the capability to set up various types of workloads and deploy them in a third party environment on their own. For example, an information technology (IT) team might have the time or expertise to deploy a VDI environment, database servers, developer infrastructures, and other enterprise applications in a third party cloud computing environment that has its own interfaces, tools, and setup requirements. Accordingly, vendors can perform these services on behalf of enterprise customers. VMware Cloud™ is an example of such a service.

Enterprise customers can have varying types of workloads that they want deployed in a third party environment. Some workloads might be mission critical and they might be willing to pay for a guaranteed service level, such as a VDI environment. Other workloads might be less mission critical and the enterprise customer might want to pay less for a non-guaranteed or best-effort level of service, such as in the case of non-essential data processing application.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to the allocation of computing units in a hosted computing environment. The computing units can be physical or virtual servers, computing instances, virtual computers, or other units of computing devices that are available in a hosted computing environment. A hosted computing environment can, for example, be an environment such as Amazon Elastic Compute Cloud (EC2) or Amazon EC2 BareMetal, which allows users to obtain computing instances in a hosted environment. Some customers of software solutions that provide more actively managed or self-managed datacenters are transitioning datacenters from private datacenters to the public cloud in implementations on hosted computing environments such as EC2. VMware Cloud (VMC) is an example of a solution that allows customers to implement applications in a public cloud environment.

For example, a virtual desktop infrastructure (VDI) environment, a container-orchestration system, and other applications can be deployed in a cluster of virtual machines that are managed by tools provided by VMC and run on virtual machines (VMs) that are also managed by VMC tools. As one example, various organizations are moving away from providing and maintaining purely physical desktops for their user bases and, instead, are moving towards providing VDI environments. As another example, an organization might utilize one or more virtual machines (VMs) to provide other types of computing services to its users, such as email access, development environments, testing environments, or other services that are deployed in a VMC environment that is powered by EC2 instances.

These applications and services are also referred to as workloads, or VM workloads. For example, a VDI workload can represent one or more VMs that are managed by VMC tools to provide VDI sessions to users of a particular enterprise. As another example, a Kubernetes workload can also represent one or more workloads implemented in a VMC deployment. A product such as VMC allows a software-defined datacenter to be implemented in a public cloud infrastructure, or a hosted computing environment.

VMC, for example, can be implemented in a hosted computing environment such as Amazon EC2 atop various types of instances. Reserved computing units, also referred to as reserved instances or reserved hosts, can represent instances that the provider of a cloud-based VM environment can acquire from a hosted computing environment on a fixed or reserved basis for the purpose of deploying customer workloads or VMs. In other words, these reserved instances can be acquired from Amazon EC2 for the purpose of running clusters of VMs for VMC customers. Reserved instances are often paid for whether they are utilized to deploy customer workloads or not. Reserved instances are generally assessed a lower cost factor than an on-demand computing unit, also referred to as an on-demand instance or on-demand host, which can be obtained on an as-needed basis. Another type of instance that can be obtained by the VM environment can be a spot computing unit, also referred to as a spot instance or spot host, which is an unused instance that can be obtained if one is available. Spot instances can be obtained at a lower cost factor than an on-demand instance because its availability is not guaranteed.

To provide customers of a cloud-based VM environment such as VMC with additional options from a cost perspective, additional workload types can be offered for which customers can pay on a per-workload basis. In the context of this disclosure, two types of workloads can be offered to users: guaranteed workloads and ephemeral workloads. A guaranteed workload is one that is offered on a guaranteed basis within a cloud-based VM environment. In other words, the provider guarantees that the customer's workload will have a host within the hosted computing environment on which the workload is running. To provide a guaranteed workload, the provider can provide a host or instance from a pool of reserved instances and, if the pool of reserved instances is exhausted, the provider can obtain on-demand instances to provide hosts for guaranteed workloads of customers.

To provide hosts for ephemeral workloads, the provider of the cloud-based VM environment can assign these workloads to hosts within the hosted computing environment if there are available hosts from the pool of reserved instances. However, if there are none, the customers workload is not executed on a host until one or more hosts from the reserved pool are available. In the case of an ephemeral workload, the provider can avoid obtaining on-demand instances for these workloads because the cost of on-demand instances in the hosted computing environment is generally higher than reserved instances. Because ephemeral workloads are not guaranteed execution, the cost of these workloads can be assigned a lower cost factor than guaranteed workloads.

Examples of this disclosure can address the scenario of assigning ephemeral workloads to hosts in a cloud-based VM environment, particularly when these workloads are competing for hosts with guaranteed workloads. In one scenario, a guaranteed workload may seek placement within the cloud-based VM environment when there are no available reserved instances or hosts within the pool of reserved instances. However, ephemeral workloads may have been previously assigned to hosts from the pool of reserved instances. In this case, one or more ephemeral workloads can be "evacuated," or removed from the cloud-based VM environment to free up one or more hosts to be assigned to a guaranteed workload.

Figure 1:
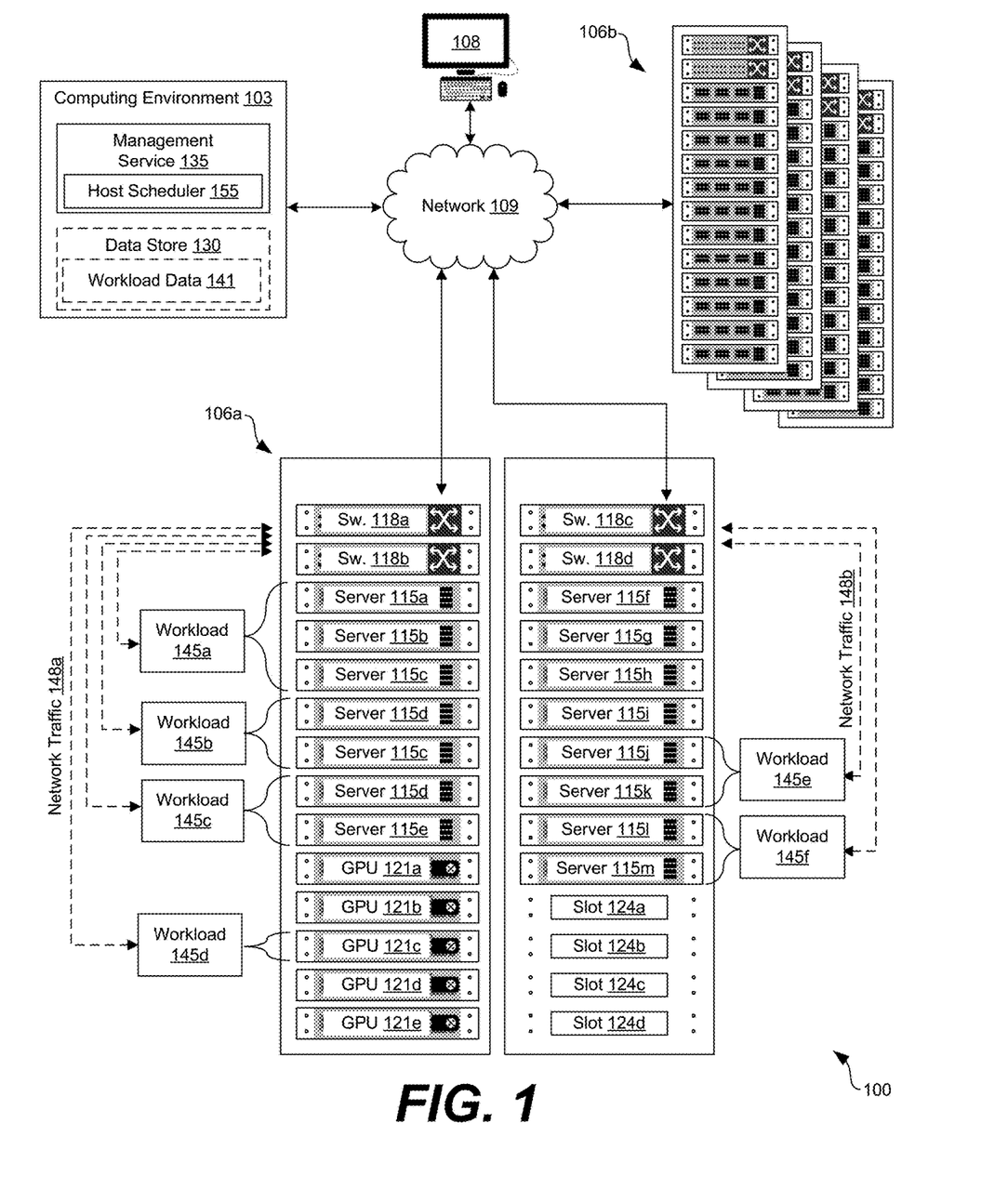
FIG. 1 is a drawing of an example of a networked environment for according to examples of the disclosure.

With reference to FIG. 1, an example of a networked environment 100 is shown. The networked environment 100 can include a hosted computing environment 103 and various computing systems 106a . . . 106b in communication with one other over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks. As the networked environment 100 can serve up virtual desktops to end users, the networked environment 100 can also be described as a virtual desktop infrastructure (VDI) environment or computing environment.

In various embodiments, the computing systems 106 can include a plurality of devices installed in racks which can make up a server bank associated with a hosted computing environment. The hosted computing environment can represent a hardware infrastructure provider such as Amazon Web Services, Microsoft Azure®, or another cloud computing provider that provides reserved or on-demand computing units that can be acquired and deployed on behalf of enterprises. A service such as VMC can be implemented atop one or more hosts or instances that are obtained from the hosted computing environment so that VM workloads can be deployed on behalf of enterprise customers without the enterprise having to set up or configure its VM workloads in a public cloud environment on their own.

The devices in the hosted computing environment can include, for example, memory and storage devices, servers 115a . . . 115m, switches 118a . . . 118d, graphics cards, central processing units (CPUs), power supplies, and similar devices. The devices, such as servers 115 and switches 118, can have dimensions suitable for quick installation in slots 124a . . . 124d on the racks. In various examples, the servers 115 can include requisite physical hardware and software to create and manage a virtualization infrastructure. The physical hardware for a server 115 can include a CPU, graphics card, data bus, memory, and other components.

However, in examples of the disclosure, the exact hardware configuration of servers or racks in the hosted computing environment can vary depending upon the provider of the hosted computing environment so long as the hosted computing environment provides hosts that appear as physical host machines on which VMs can be executed. In some examples, hosts provided by the hosted computing environment can provide a bare-metal server of a particular CPU and memory configuration. It is understood that the computing systems 106 are scalable, meaning that the computing systems 106 in the networked environment 100 can be scaled dynamically to include additional servers 115, switches, GPUs, power sources, and other components, without degrading performance of the virtualization environment.

In examples of this disclosure, a VM or workload can be deployed on a host, which can represent a server 115 or a computing unit provided by a hosted computing environment. The computing unit can represent a server 115 or a virtualized or abstracted representation of a server 115. For example, the host can represent a bare-metal server on which the cloud-based VM environment can execute other software, virtualization services, hypervisors, and other utilities to provide an infrastructure in which workloads 145 can be deployed on behalf of customers.

The computing environment 103 can represent one or more computing devices from which a cloud-based VM environment can be managed. The computing environment 103 can include, for example, a server or any other system providing computing capability. Alternatively, the computing environment 103 can include a plurality of computing devices that are arranged, for example, in one or more server banks, computer banks, computing clusters, or other arrangements. The computing environments 103 can include a grid computing resource or any other distributed computing arrangement. The computing devices can be located in a single installation or can be distributed among many different geographical locations. Although shown separately from the computing systems 106, it is understood that in some examples the computing environment 103 the computing systems 106 can be a portion of the computing environment 103.

The computing environment 103 can include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing systems 106 and client devices 108 for end users over the network 109, sometimes remotely, the computing environment 103 can be described as a remote computing environment 103 in some examples. Additionally, in some examples, the computing environment 103 can be implemented in the hosted computing environment on a computing system 106. In some examples, the computing environment 103 can be referred to as a management cluster or management workload that is running on a host in the computing systems 106.

The computing environment 103 can include a data store 130. The data store 130 can include memory of the computing environment 103, mass storage resources of the computing environment 103, or any other storage resources on which data can be stored by the computing environment 103. In some examples, the data store 130 can include one or more relational databases, such as structure query language (SQL) databases, non-SQL databases, or other relational or non-relational databases. The data stored in the data store 130, for example, can be associated with the operation of the various services or functional entities described below.

In some examples, the data store 130 can include a database or other memory that includes, for example, workload data 141. Workload data 141 can include metadata about the workloads 145 that are deployed across the computing systems 106 in an enterprise deployment. Workload data 141 can include billing and usage data, state data associated with workloads 145, and other information necessary to run and/or migrate workloads 145 within the environment. The workload data 141 can also identify which hosts provided by the hosted computing environment on which a particular workload 145 is executed.

The components executed on the computing environment 103 can include, for example, a management service 135 as well as other applications, services, processes, systems, engines, or functionality not discussed in detail herein. The management service 135 can be executed to oversee the operation of a cloud-based VM environment executed on hosts provided by the computing systems 106 of the hosted computing environment. In some examples, an enterprise, organization, or other entity, can operate the management service 135 to oversee or manage the operation of reserved, on-demand, and spot hosts that can be provided by the hosted computing environment. Through the management service 135, information technology (IT) personnel or other administrators can create virtual desktops, VMs, or other computing resources in a data center capable of being delivered to and accessed by employees or other individuals by hosts from the computing systems 106 of the hosted computing environment.

Various physical and virtual components of the computing systems 106 can process workloads 145a . . . 145f. Workloads 145 can refer to an application or process that is deployed on a host from the hosted computing environment. The management service 135 can orchestrate deployment and management of workloads 145 onto hosts across a fleet of servers 115 in various geographic locations and data centers in the hosted computing environment. The workloads 145 can be associated with virtual machines or other software executing on the servers 115. For instance, the workloads 145 can include tasks to be processed to provide users of an enterprise with remote desktop sessions or other virtualized computing sessions. The workloads 145 can also represent containerized applications that are running to provide services to users of the enterprise.

In some instances, a workload 145 can require multiple servers 115 to execute. In other instances, a workload 145 can be executed on a single server 115. In many cases, multiple workloads 145, such as multiple VDI sessions, can be deployed on a single server 115 and on data storage resources within the same rack as the server 115.

As noted above, there can be two different types of workloads 145 deployed in a cloud-based VM environment: a guaranteed workload and an ephemeral workload. A guaranteed workload is guaranteed execution on a host in the hosted computing environment. An ephemeral workload is only guaranteed that it will be executed on a best-effort basis if there is an available host in the hosted computing environment. Accordingly, ephemeral workloads can also be evacuated from the environment. Evacuation of an ephemeral workload means that the workload is shut down or destroyed to make way for another workload, such as a guaranteed workload. Evacuation can occur after a timeout period during which the ephemeral workload is expected to perform a clean-up process whereby any data necessary to be saved or archived is done so before the workload is destroyed. Evacuation can occur if a newly created guaranteed workload requires placement on a host in the hosted computing environment.

The host scheduler 155 can perform the task of placing workloads 145, such as guaranteed workloads and ephemeral workloads, onto one or more hosts in a hosted computing environment. The host scheduler 155 can maintain data regarding a pool of hosts based upon the workload data 141 that identifies the hosts on which workloads 145 are deployed. The pool of hosts can comprise a pool of reserved instances in the hosted computing environment. The host scheduler 155 can also receive requests from customers or other applications or services to place a workload 145 onto a host from the hosted computing environment. The workload 145 can be placed into a cluster of hosts assigned to a customer or user within the cloud-based VM environment.

The management service 135 can maintain a listing of active or inactive workloads 145 as well as oversee the assignment of various workloads 145 to various devices in the computing systems 106. For instance, the management service 135 can assign a workload 145 lacking in available resources to a host that has resources sufficient to handle the workload 145. The workloads 145 can be routed to various servers 115 by the switches 118 as network traffic 148a . . . 148b. The management service 135 can also maintain a listing of various clusters of workloads that are associated with customers of the cloud-based VM environment.

Figure 2:
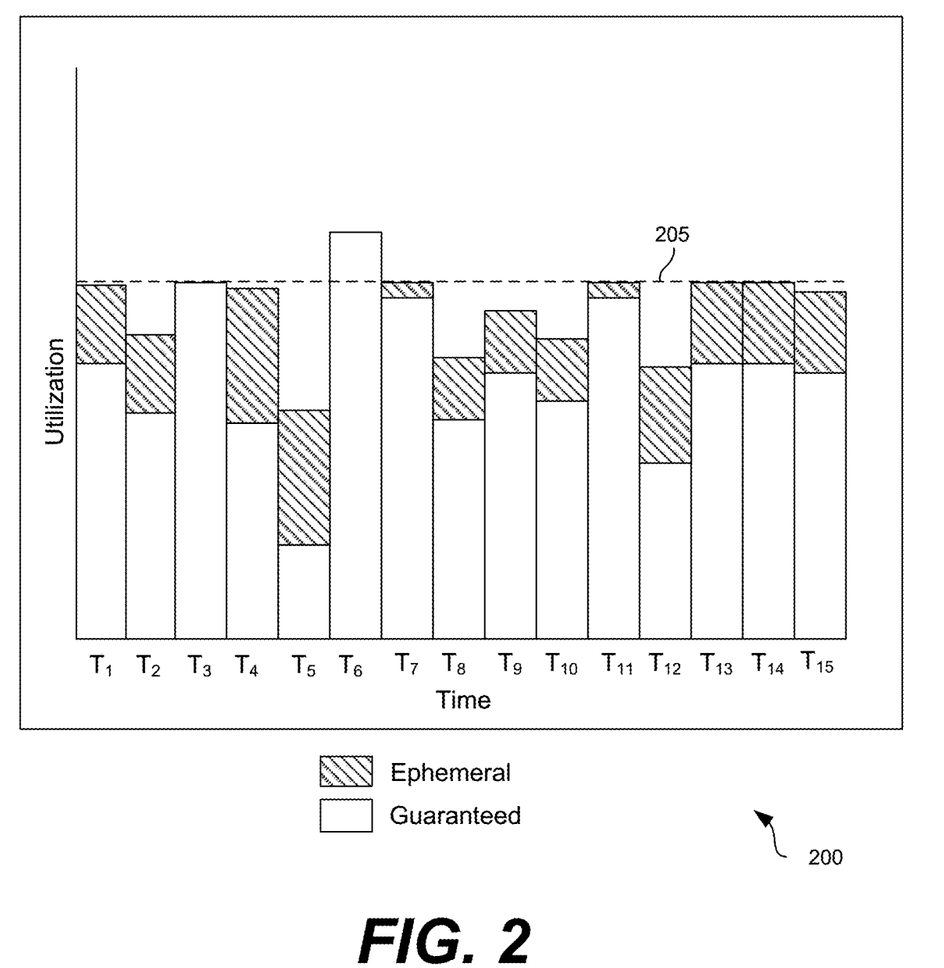
FIG. 2 is a drawing showing an example of allocation of workloads according to various examples of the disclosure.

Referring next to FIG. 2, an illustrative chart 200 is provided that shows an example of how examples of the disclosure can deploy workloads to hosts in a hosted computing environment that powers a cloud-based VM environment. In the chart 200 of FIG. 2, the Y-axis represents utilization by workloads 145 of a pool of reserved instances or reserved hosts from a pool of reserved instances that is maintained or managed by the management service 135. The X-axis represents units of time. Line 205 represents a number or quantity of reserved instances allocated to the cloud-based VM environment. The quantity of reserved instances can be obtained from the hosted computing environment by an administrator of the cloud-based VM environment. The reserved instances can represent bare-metal servers or hosts that are provisioned to execute one or more workloads 145 on behalf of customers of the cloud-based VM environment.

Referring to the hypothetical scenario in chart 200, at time T1, the guaranteed workloads in the cloud-based VM environment does not meet or exceed the quantity of reserved instances. Therefore, in this situation, the management service 116 can allocate ephemeral workloads to the reserved instances up line 205, again representing the total quantity of reserved instances in the cloud-based VM environment. The reason the management service 135 can allocate ephemeral workloads to hosts is because there are effectively free and unused hosts in the pool of reserved instances. Similarly, at time T2, the number of executing guaranteed workloads has dropped, so the management service 135 can allocate hosts to ephemeral and guaranteed workloads without exceeding the quantity of reserved instances.

However, at time T3, the number of guaranteed workloads has increased and the management service 116 can determine that the guaranteed workloads is likely to consume all available hosts in the pool of reserved instances. In this scenario, the management service 135 can evacuate ephemeral workloads that are placed on hosts. In this example, the management service 135 can evacuate all ephemeral workloads to make way for the additional guaranteed workloads in the cloud-based VM environment. The ephemeral workloads can be evacuated by shutting them down after a timeout period. In one example, the evacuated ephemeral workloads can be given a notice by the management service 135 that they will be evacuated after a timeout period to provide sufficient time for any cleanup or backup operations to be performed.

Continuing the example, at time T4, the number of guaranteed workloads in the environment has decreased, making way for ephemeral workloads to be placed onto free hosts or excess capacity from the reserved instance pool. At time T6, the number of guaranteed workloads has again increased, requiring evacuation of ephemeral workloads from the environment. Additionally, the management service 135 can determine that the number of guaranteed workloads requires additional hosts above the quantity of reserved instances. Accordingly, the management service 135 can obtain on-demand instances from the hosted computing environment to meet the demand of the guaranteed workloads. It should be noted that in this scenario, on-demand hosts are not utilized for ephemeral workloads because the cloud-based VM environment can provide execution of ephemeral workloads on a best-effort basis and avoid obtaining potentially costly on-demand instances for their execution.

Continuing the example, the time T11, the management service 135 can determine that the number of guaranteed workloads has increased, requiring evacuation of some, but not all ephemeral workloads. In this scenario, the management service 135 can identify ephemeral workloads to evacuate based upon a cluster health score that can be calculated for clusters of workloads 145. A cluster of workloads 145 is a collection of workloads 145 that are created on behalf of a user or customer in the cloud-based VM environment. A cluster can represent a combination of ephemeral and guaranteed workloads. A cluster can also represent a collection of ephemeral workloads or a collection of guaranteed workloads.

A cluster health score can be calculated to determine the health of a cluster after shutdown or evacuation of an ephemeral workload within the cluster. The cluster health score represents a score of the overall health of the cluster. In one example, the cluster health score can represent an average of respective VM health scores calculated within a respective cluster. In other words, the cluster health score represents how happy respective VMs in a cluster are in terms of resource allocation.

VM health scores can be computed by an existing resource allocation algorithm that might exist within a product such as VMware DRS. The score can model VM resource usage (e.g., CPU, memory, network, or storage) and the resource contention on a host. When there is resource contention, VM performance can drop and result in a worse VM or cluster health score. In some examples, a linear model for CPU contention, an exponential model for memory contention, a non-linear model for network contention, or other models can be used or factored in to determine and calculate a cluster health score.

If an ephemeral workload is working with other workloads 145 within the cluster to complete various tasks, removal of the workload might result in a lower cluster health score than a different cluster where an ephemeral workload is only working on data archiving tasks, for example.

Accordingly, at time T11, the management service 135 can evacuate one or more ephemeral workloads, but not necessarily all ephemeral workloads, to provide sufficient host capacity for the guaranteed workloads and a subset of the remaining ephemeral workloads. At T12, the number of guaranteed workloads has again reduced, which provides sufficient hosts for all ephemeral and guaranteed workloads. Continuing to T13, the management service 135 can again select one or more ephemeral workloads to evacuate from the environment based upon a cluster health score that can be calculated for one or more of the clusters of workloads within the cloud-based VM environment.

Figure 3:
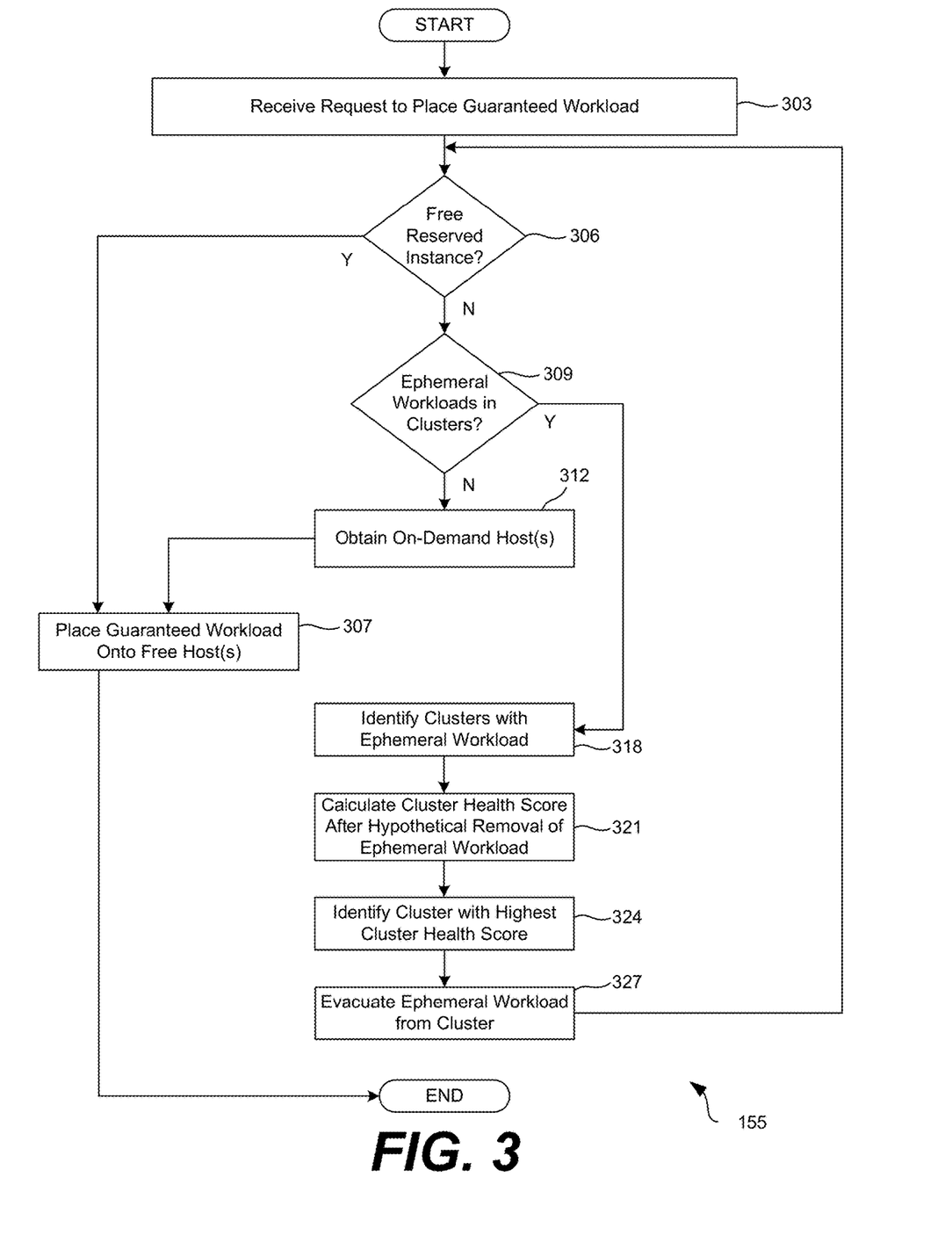
FIG. 3 is a flowchart illustrating functionality implemented by components of the environment of FIG. 1.

Moving on to FIG. 3, shown is a flowchart that provides one example of the operation of a portion of the networked environment 100. The flowchart of FIG. 3 can be viewed as depicting an example of elements of a method implemented by the management service 135 or the host scheduler 155 executing in the computing environment 103 according to one or more examples. FIG. 3 illustrates how the host scheduler 155 can evacuate an ephemeral workload from a cluster of workloads in a cloud-based VM environment. The separation or segmentation of functionality as discussed herein is presented for illustrative purposes only.

Beginning with step 303, the host scheduler 155 can receive a request to place a guaranteed workload onto a host in a cloud-based VM environment. As noted above, the cloud-based VM environment can comprise a pool of reserved instances or reserved hosts that are obtained from a hosted computing environment. The reserved instances can comprise servers, bare metal instances, or virtualized computers provided by a hosted computing environment. The cloud-based VM environment can provide additional software, services, and management tools that allow customers to deploy VM workloads in clusters in a public or hybrid cloud environment.

Next, at step 306, the host scheduler 155 can determine if there is an available instance within the pool of reserved instances on which the guaranteed workload can be placed. If there is an available host with sufficient resources to execute the guaranteed workload, the process can proceed to step 307, where the host scheduler 155 can place the guaranteed workload onto a free host or excess capacity from the pool of reserved instances, or a host pool. The host scheduler 155 can perform tasks such as billing, data replication, disk management, and other administrative tasks to setup one or more VMs for execution on the free host to power one or more applications associated with the workload. The host scheduler 155 can remove the host onto which the guaranteed workload is placed from the pool of free reserved hosts if the workload execution consumes enough resources such that an additional workload cannot be executed on the host. From step 307, the process can proceed to completion, as the host scheduler 155 has placed the requested workload onto a host within the cloud-based VM environment.

If there is no free reserved instance or no excess capacity in a pool of reserved instances assigned to the cloud-based VM environment at step 306, the process proceeds from step 306 to step 309. At step 309, the host scheduler determines whether there are any ephemeral workloads that are placed onto hosts within the cloud-based VM environment. If there are no ephemeral workloads that are currently placed in the environment, the host scheduler 155 must obtain an on-demand instance from the hosted computing environment, as the pool of reserved instances has been exhausted but the host scheduler 155 must still place the workload because guaranteed workloads are placed in a guaranteed basis rather than a best-effort basis. In this scenario, the process proceeds from step 309 to step 312.

At step 312, the host scheduler 155 can obtain an on-demand instance from the hosted computing environment for utilization by the requested workload. As noted above, on-demand instances may be associated with a higher cost factor than a reserved instance, so the workload scheduler can avoid obtaining an on-demand instance unless a guaranteed workload requires a host, the pool of reserved instances is exhausted, and there are no ephemeral workloads in the cloud-based VM environment that are occupying hosts.

From step 312, the process can proceed to step 307, where the host scheduler 155 can place the guaranteed workload onto the obtained on-demand host. The host scheduler 155 can perform tasks such as billing, data replication, disk management, and other administrative tasks to setup one or more VMs for execution on the on-demand host to power one or more applications associated with the workload. In some implementations, the host scheduler can monitor utilization of reserved instances from the pool of reserved instances and migrate the workload from the on-demand instance to a reserved instance should a reserved instance later become available. Again, from step 307, the process can proceed to completion, as the host scheduler 155 has placed the requested workload onto a host within the cloud-based VM environment.

If there are ephemeral workloads that are currently placed in the cloud-based VM environment, the host scheduler 155 can proceed from step 309 to step 318. At step 318, the host scheduler 155 can identify clusters of workloads 145 within the cloud-based VM environment that contain one or more ephemeral workloads. The clusters that contain one or more ephemeral workloads are candidates for evacuation of an ephemeral workload to make way for the requested guaranteed workload. Accordingly, the host scheduler 155 can identify clusters that contain one or more ephemeral workloads that, if evacuated, can free up sufficient reserved instances for execution of the requested guaranteed workload.

At step 321, the host scheduler 155 can calculate a cluster health score for a cluster after removal of an ephemeral workload from the identified clusters. The cluster health score can represent a score that enumerates the health of the cluster of VMs after a hypothetical removal of one or more ephemeral workloads from the cluster. The one or more workloads that are hypothetically removed can free sufficient reserved instances in the pool of reserved hosts to allow placement of the requested guaranteed workload only one or more reserved instances.

At step 324, the host scheduler 155 can identify a cluster from the identified clusters that has the highest cluster health score after hypothetical removal of the one or more ephemeral workloads. In other words, the host scheduler 155 can identify a cluster from the identified clusters that has the best cluster health score after hypothetical removal of the one or more ephemeral workloads. The cluster with the best cluster health after hypothetical removal of one or more ephemeral workloads represents the best candidate for evacuation of one or more ephemeral workloads to make way for the requested guaranteed workload. Additionally, in some examples, the host scheduler 155 can identify multiple clusters from which an ephemeral workload can be evacuated to make way for the requested guaranteed workload if the requested workload requires more than one host or instance for execution.

At step 327, the one or more ephemeral workloads can be evacuated from the cluster or reserved instance on which they are executing. Evacuation of an ephemeral workload can comprise notifying the workload, by the management service 116, that the ephemeral workload will be shut down after a specified timeout period. The timeout period can be given to provide the ephemeral workload with the timeout period to perform data replication, cleanup, archiving, or any other remaining tasks that might be necessary to save the state of the ephemeral workload. Upon evacuation of the one or more ephemeral workloads at step 327, the process can return to step 306, where the host scheduler can determine whether the evacuation process has freed sufficient reserved instances to place the guaranteed workload within the cloud-based VM environment.

Upon returning to step 306, if there is now a free instance in the pool of reserved instances, the process can proceed to step 307, where the host scheduler 155 can placed the requested guaranteed workload onto the freed one or more instances from the pool of reserved instances. Thereafter, the process can proceed to completion.

Figure 4:
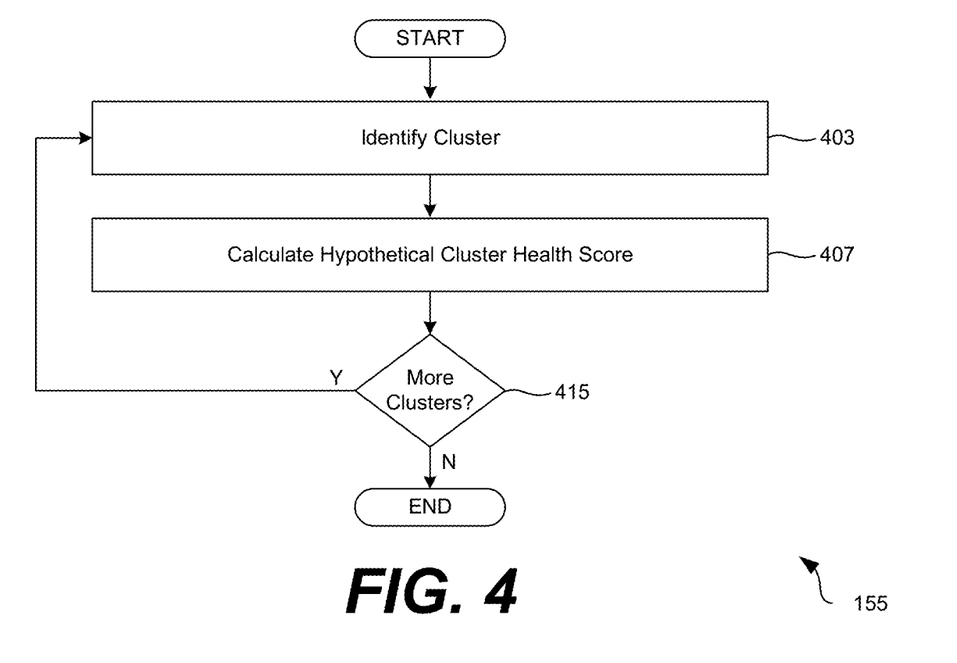
FIG. 4 is a flowchart illustrating functionality implemented by components of the environment of FIG. 1.

Turning now to FIG. 4, shown is a flowchart that provides one example of the operation of a portion of the networked environment 100. The flowchart of FIG. 4 can be viewed as depicting an example of elements of a method implemented by the host scheduler 155 executing in the computing environment 103 according to one or more examples. FIG. 4 illustrates how the host scheduler 155 can calculate a cluster health score that is utilized by the host scheduler 155 to place a guaranteed workload onto the cloud-based VM environment at step 321 (FIG. 3). The separation or segmentation of functionality as discussed herein is presented for illustrative purposes only.

At step 403, the host scheduler can identify a cluster for which the cluster health score is to be calculated. As noted in the discussion of FIG. 3, the host scheduler can identify those clusters that have one or more ephemeral workloads executing on a reserved instance at step 318. Accordingly, the cluster can be identified at step 318 and an identifier associated with the cluster determined at step 403 for the purpose of calculating a cluster health score.

At step 407, the host scheduler 155 can calculate a cluster health score that is based upon evacuating one or more ephemeral workloads from the cluster. The host scheduler 155 can calculate hypothetical cluster health scores based upon hypothetical removal of multiple combinations of ephemeral workloads from the cluster and return the highest or best cluster health score. In this scenario, the host scheduler 155 can also specify the ephemeral workloads for which a particular cluster health score is calculated. In some examples, the host scheduler 155 can simply identify a particular combination of ephemeral workloads in a cluster that, if evacuated, would result in the highest cluster health score and also result in freeing sufficient reserved instances so that the requested guaranteed workload can be placed. At step 415, the host scheduler 155 can determine if there are additional clusters for which a cluster health score should be calculated. If so, the process can return to step 403. Otherwise, the process can proceed to completion.

Stored in the memory device are both data and several components that are executable by the processor. Also stored in the memory can be a data store 130 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices 108 can be used to access user interfaces generated to configure or otherwise interact with the management service 135. These client devices 108 can include a display upon which a user interface generated by a client application for providing a virtual desktop session (or other session) can be rendered. In some examples, the user interface can be generated using user interface data provided by the computing environment 103. The client device 108 can also include one or more input/output devices that can include, for example, a capacitive touchscreen or other type of touch input device, fingerprint reader, or keyboard.

Although the management service 135 and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
    at least one computing device including at least one processor;
    program instructions stored in memory and executable in the at least one computing device that, when executed by the at least one computing device, cause the at least one computing device to:
    determine in a deployment of virtual machine workloads in a hosted computing environment that there is an excess capacity of at least one reserved host of a plurality of reserved hosts from a host pool assigned to the deployment;

identify a first ephemeral workload to assign to a first reserved host of the plurality of reserved hosts in the deployment of virtual machine workloads;

place the first ephemeral workload to the first reserved host in the deployment of virtual machine workloads;

obtain a request to place a guaranteed workload in the deployment of virtual machines workloads;

determine that there is no excess capacity in the host pool assigned to the deployment;

identify a plurality of clusters of workloads running on at least one of the plurality of reserved hosts from the host pool, individual clusters of workloads including one or more respective ephemeral workloads;

calculate a respective cluster health score for the individual clusters of workloads based upon a health of the respective cluster after a hypothetical removal of multiple combinations of the one or more respective ephemeral workloads within the respective cluster, wherein calculating the respective cluster health score comprises identifying a respective particular combination of ephemeral workloads from the multiple combinations of the at least one respective ephemeral workloads within the respective cluster to return a highest cluster health score;

identify a second reserved host of the plurality of reserved hosts based on the highest cluster health score of a first cluster of workloads from the plurality of clusters of workloads, the first cluster of workloads running on the second reserved host within the host pool, the first cluster of workloads comprising a first combination of ephemeral workloads that if evacuated would result in the highest cluster health score;

evacuate the first combination of ephemeral workloads from the second reserved host; and place the guaranteed workload on the second reserved host, wherein the guaranteed workload is guaranteed execution in the hosted computing environment, and the first ephemeral workload, the first combination of ephemeral workloads, and the one or more respective ephemeral workloads are allowed execution in the hosted computing environment based at least in part on an availability within the hosted computing environment.

2. The system of claim 1, wherein the cluster of workloads comprises a collection of virtual machine workloads assigned to a particular user or a particular customer within the deployment.

3. The system of claim 1, wherein the host pool comprises a plurality of virtual machines that are executed using a plurality of reserved computing units assigned to the deployment.

4. The system of claim 1, wherein the program instructions select the second reserved host by at least:

ranking a plurality of respective cluster health scores for the identified plurality of clusters of workloads; and identifying the first cluster of workloads from the identified clusters with a respective cluster health score indicating a highest health relative to a remainder of the identified clusters.

5. The system of claim 1, wherein the program instructions determine that there is no excess capacity in the plurality of reserved hosts in the host pool by determining that the virtual machine workloads are fully utilizing the reserved hosts assigned to the deployment.

6. The system of claim 1, wherein the first combination of ephemeral workloads is evacuated from the second reserved host after a timeout period.

7. The system of claim 1, wherein the guaranteed workload requires multiple hosts for execution, and wherein the program instructions further cause the at least one computing device to at least:

identify a third reserved host of the plurality of reserved hosts based on the respective cluster health score of a second cluster of workloads from the plurality of clusters of workloads, the second cluster of workloads running on the third reserved host within the host pool; and place the guaranteed workload on the second reserved host and the third reserved host.

8. A non-transitory computer-readable medium for predictive allocation of computing resources in a virtual desktop infrastructure environment, comprising embodying program code executable in at least one computing device that, when executed by at least one processor of the at least one computing device, causes the at least one computing device to:

determine in a deployment of virtual machine workloads in a hosted computing environment that there is an excess capacity of at least one reserved host of a plurality of reserved hosts from a host pool assigned to the deployment;

identify a first ephemeral workload to assign to a first reserved host of the plurality of reserved hosts in the deployment of virtual machine workloads;

place the first ephemeral workload to the first reserved host in the deployment of virtual machine workloads;

obtain a request to place a guaranteed workload in the deployment of virtual machines workloads;

determine that there is no excess capacity in the host pool assigned to the deployment;

identify a plurality of clusters of workloads running on at least one of the plurality of reserved hosts from the host pool, individual clusters of workloads including one or more respective ephemeral workloads;

calculate a respective cluster health score for the individual clusters of workloads based upon a health of the respective cluster after a hypothetical removal of multiple combinations of the one or more respective ephemeral workloads within the respective cluster, wherein calculating the respective cluster health score comprises identifying a respective particular combination of ephemeral workloads from the multiple combinations of the at least one respective ephemeral workloads within the respective cluster to return a highest cluster health score;

identify a second reserved host of the plurality of reserved hosts based on the highest cluster health score of a first cluster of workloads from the plurality of clusters of workloads, the first cluster of workloads running on the second reserved host within the host pool, the first cluster of workloads comprising a first combination of ephemeral workloads that if evacuated would result in the highest cluster health score;

evacuate the first combination of ephemeral workloads from the second reserved host; and place the guaranteed workload on the second reserved host, wherein the guaranteed workload is guaranteed execution in the hosted computing environment, and the first ephemeral workload, the first combination of ephemeral workloads, and the one or more respective ephemeral workloads are allowed execution in the hosted computing environment based at least in part on an availability within the hosted computing environment.

9. The non-transitory computer-readable medium of claim 8, wherein the cluster of workloads comprises a collection of virtual machine workloads assigned to a particular user or a particular customer within the deployment.

10. The non-transitory computer-readable medium of claim 8, wherein the host pool comprises a plurality of virtual machines that are executed using a plurality of reserved computing units assigned to the deployment.

11. The non-transitory computer-readable medium of claim 8, wherein the program code selects the second reserved host by at least:
ranking a plurality of respective cluster health scores for the identified plurality of clusters of workloads; and
identifying the first cluster of workloads from the identified clusters with a respective cluster health score indicating a highest health relative to a remainder of the identified clusters.

12. The non-transitory computer-readable medium of claim 8, wherein the program code determines that there is no excess capacity in the plurality of reserved hosts in the host pool by determining that the virtual machine workloads are fully utilizing the reserved hosts assigned to the deployment.

13. The non-transitory computer-readable medium of claim 8, wherein the first combination of ephemeral workloads is evacuated from the second reserved host after a timeout period.

14. The non-transitory computer-readable medium of claim 8, wherein the guaranteed workload requires multiple hosts for execution, and wherein the program code further causes the at least one computing device to at least:
identify a third reserved host of the plurality of reserved hosts based on the respective cluster health score of a second cluster of workloads from the plurality of clusters of workloads, the second cluster of workloads running on the third reserved host within the host pool; and
place the guaranteed workload on the second reserved host and the third reserved host.

15. A method, comprising:
determining in a deployment of virtual machine workloads in a hosted computing environment that there is an excess capacity of at least one reserved host of a plurality of reserved hosts from a host pool assigned to the deployment;
identifying a first ephemeral workload to assign to a first reserved host of the plurality of reserved hosts in the deployment of virtual machine workloads;
placing the first ephemeral workload to the first reserved host in the deployment of virtual machine workloads;
obtaining a request to place a guaranteed workload in the deployment of virtual machines workloads;
determining that there is no excess capacity in the host pool assigned to the deployment;
identifying a plurality of clusters of workloads running on at least one of the plurality of reserved hosts from the host pool, individual clusters of workloads including one or more respective ephemeral workloads;
calculating a respective cluster health score for the individual clusters of workloads based upon a health of the respective cluster after a hypothetical removal of multiple combinations of the one or more respective ephemeral workloads within the respective cluster, wherein calculating the respective cluster health score comprises identifying a respective particular combination of ephemeral workloads from the multiple combinations of the at least one respective ephemeral workloads within the respective cluster to return a highest cluster health score;
identifying a second reserved host of the plurality of reserved hosts based on the highest cluster health score of a first cluster of workloads from the plurality of clusters of workloads, the first cluster of workloads running on the second reserved host within the host pool, the first cluster of workloads comprising a first combination of ephemeral workloads that if evacuated would result in the highest cluster health score;
evacuating the first combination of ephemeral workloads from the second reserved host; and
placing the guaranteed workload on the second reserved host,
wherein the guaranteed workload is guaranteed execution in the hosted computing environment, and the first ephemeral workload, the first combination of ephemeral workloads, and the one or more respective ephemeral workloads are allowed execution in the hosted computing environment based at least in part on an availability within the hosted computing environment.

16. The method of claim 15, wherein the host pool comprises a plurality of virtual machines that are executed using a plurality of reserved computing units assigned to the deployment.

17. The method of claim 15, wherein selecting the second reserved host further comprises:
ranking a plurality of respective cluster health scores for the identified plurality of clusters of workloads; and
identifying the first cluster of workloads from the identified clusters with a respective cluster health score indicating a highest health relative to a remainder of the identified clusters.

18. The method of claim 15, wherein determining that there is no excess capacity in the plurality of reserved hosts in the host pool by determining that the virtual machine workloads are fully utilizing the reserved hosts assigned to the deployment.

19. The method of claim 15, wherein the first combination of ephemeral workloads is evacuated from the second reserved host after a timeout period.

20. The method of claim 15, wherein the guaranteed workload requires multiple hosts for execution, and further comprising:
identifying a third reserved host of the plurality of reserved hosts based on the respective cluster health score of a second cluster of workloads from the plurality of clusters of workloads, the second cluster of workloads running on the third reserved host within the host pool; and
placing the guaranteed workload on the second reserved host and the third reserved host.

* * * * *